United States Patent
Caillot

(10) Patent No.: US 9,963,114 B2
(45) Date of Patent: May 8, 2018

(54) HEATING DEVICE INTENDED FOR A WINDSCREEN WIPER AND WINDSCREEN WIPER INCLUDING SUCH A HEATING DEVICE

(71) Applicant: Valeo Systèmes d'Essuyage, Le Mesnil Saint Denis (FR)

(72) Inventor: Gérald Caillot, Cernay la Ville (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 244 days.

(21) Appl. No.: 14/266,140

(22) Filed: Apr. 30, 2014

(65) Prior Publication Data
US 2014/0317872 A1  Oct. 30, 2014

(30) Foreign Application Priority Data

Apr. 30, 2013  (FR) ...................... 13 53985

(51) Int. Cl.
*B60S 1/38* (2006.01)
*B60S 1/52* (2006.01)

(52) U.S. Cl.
CPC ........... *B60S 1/3805* (2013.01); *B60S 1/3881* (2013.01); *B60S 1/524* (2013.01); *B60S 1/381* (2013.01)

(58) Field of Classification Search
CPC ............................. B60S 1/3805; B60S 1/3803
USPC .............. 15/250.07, 250.05, 250.06, 250.08, 15/250.09
See application file for complete search history.

(56) References Cited

U.S. PATENT DOCUMENTS

| | | | | |
|---|---|---|---|---|
| 5,603,856 A | * | 2/1997 | Bischoff | B60S 1/3805 15/250.05 |
| 2004/0211021 A1 | * | 10/2004 | Weber | B60S 1/3856 15/250.32 |
| 2012/0291216 A1 | * | 11/2012 | Schauble | B60S 1/3805 15/250.01 |

FOREIGN PATENT DOCUMENTS

| | | | | |
|---|---|---|---|---|
| FR | 2283030 A1 | * | 3/1976 | ............ B60S 1/3805 |
| FR | 2962093 A1 | * | 1/2012 | ............ B60S 1/3805 |
| WO | 2010/044768 A1 | | 4/2010 | |
| WO | 2012/000868 A1 | | 1/2012 | |

OTHER PUBLICATIONS

FR2283030A1 (machine translation), 1976.*
FR2962093A1 (machine translation), 2012.*
The First Office Action issued in corresponding Chinese Patent Application No. 201410316952.4, dated May 4, 2017 (21 pages).

* cited by examiner

*Primary Examiner* — Andrew A Horton
(74) *Attorney, Agent, or Firm* — Osha Liang LLP

(57) ABSTRACT

Heating device including at least one vertebra (3) adapted to be mounted longitudinally in at least one housing of a windscreen wiper, the so-called upper face (13) of the vertebra (3) facing the actuator arm in the assembled position of the wiper and the actuator arm and at least one heating element (2) a first portion (14) of which is on the upper face (13) of the vertebra (3). A second portion (14') of the heating element (2) is on the lower face (13') of the vertebra (3), opposite the upper face (13), the first and second portions (14, 14') of the heating element (2) on the upper face (13) and the lower face (13') of the vertebra (3) being in electrical contact with each other.

15 Claims, 4 Drawing Sheets

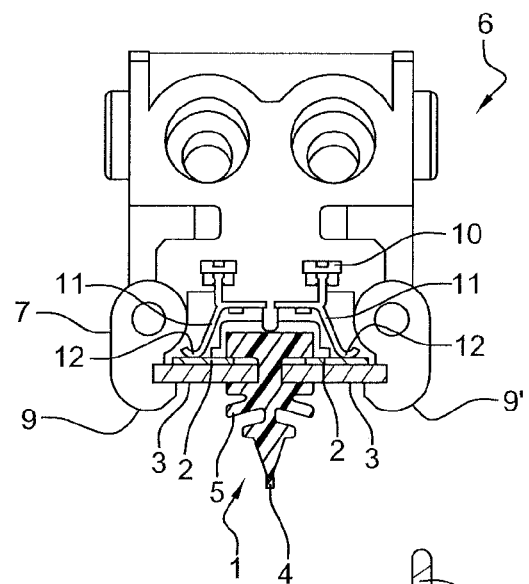
Fig. 1
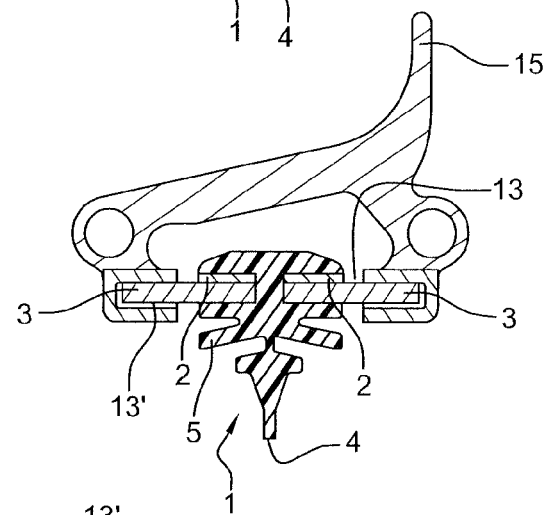
Fig. 2
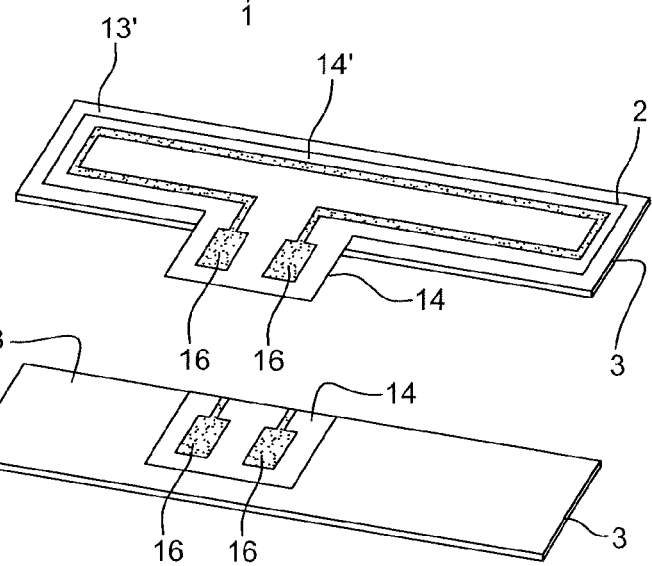
Fig. 3
Fig. 4

HEATING DEVICE INTENDED FOR A WINDSCREEN WIPER AND WINDSCREEN WIPER INCLUDING SUCH A HEATING DEVICE

The present invention concerns a heating device intended for a windscreen wiper and the windscreen wiper including such a heating device.

The invention notably applies to a heating device including a structural element such as a vertebra carrying a heating element, the vertebra being connected to a wiper blade of the windscreen wiper.

Windscreen wipers including heating elements may notably be installed on vehicles to de-ice the wiper in very cold weather and to prevent it being stuck to the windscreen by ice and/or to de-ice sprayer manifolds integrated into the wiper.

As represented in FIGS. 1 and 2, a prior art heated windscreen wiper 1 typically includes:
- two vertebrae 3 in the form of blades that support a shaped part 15 commonly referred to as a "spoiler",
- two heating films 2 including electrical resistances, each heating film 2 being on one of the faces of a respective vertebra 3, and
- a longitudinal axis wiper blade 4 including a longitudinal axis body 5 that includes connection means of the vertebra 3; these connection means consist of two longitudinal axis lateral grooves conformed to allow each vertebra 3 to be mounted longitudinally inside a respective groove.

The wiper 1 is connected to the actuator arm of a windscreen wiper by means of a hydraulic and electrical connection member 6 that includes:
- a hydraulic connector 7 that includes at least two pairs of outlet connectors (not represented) each intended to be connected to a manifold (not represented) for feeding and distributing a cleaning and/or de-icing fluid, these manifolds that are on either side of the wiper 1 or included in the wiper 1 enabling the fluid to be ejected in the vicinity of or directly from the wiper 1; at least one inlet connector (not represented) connected on the one hand to a feed pipe (not represented) connected to a source of cleaning and/or de-icing fluid and on the other hand to the outlet connectors; and a device, such as a multiway valve (not represented), for guiding the flow of the fluid toward one of the two pairs of outlet connectors as a function of the required direction of spraying of the cleaning and/or de-icing fluid, and
- an adapter for articulating the wiper 1 to the windscreen wiper actuator arm, this adapter 8 being connected to the hydraulic connector 7.

The hydraulic connector 7 includes two facing longitudinal hooks 9, 9' in part delimiting a longitudinal housing in which the wiper 1 is partially accommodated in the final assembly position.

Each hook 9, 9' has on its internal face a longitudinal groove conformed to allow each vertebra 3 to be mounted longitudinally inside a respective groove.

In this way, the wiper 1 is built by placing the wiper under the hydraulic connector 7, orienting the vertebrae 3 so that each is at an angle substantially equal to 45° to the horizontal section plane of the wiper 1, lowering the connector 7 through a movement in vertical translation, then inserting each vertebra 3 into a respective groove of the hydraulic connector 7. The body 5 of the wiper blade 4 is made from a flexible material in order to allow correct orientation of the vertebra 3 during mounting of the wiper 1 and the hydraulic connection member 6.

The hydraulic connector 7 includes an electrical connector (not represented) connected to the electrical circuit of the vehicle.

The hydraulic connector 7 is connected to the heating films 2 by means of an electrical connection device 10 that includes a pair of electrically conductive feet 11 connected to the electrical connector. Each foot 11 is substantially the shape of a tongue having at its end a shoe 12 in contact with a respective heating film 2. In the assembled position, the face of the vertebra 3 carrying the heating film 2, this face being referred to as the upper face, faces the shoes 12.

Changing the material of the heating elements in order to improve resistance to corrosion and abrasion may prove desirable, reflected, for example, if brass is replaced by stainless steel, in the necessity to increase the size of the heating elements because of the different resistivities of brass and stainless steel.

However, on increasing the size of the heating elements in a small space, the heating element may have a width greater than that of the vertebra or at least a width that can lead to undesirable contact with some parts of the connector.

The object of the present invention is to remedy these drawbacks by proposing a heating device included in a windscreen wiper and the windscreen wiper including such a heating device, the structure of which allows assembly of the vertebra carrying a larger heating element without necessitating an increase in the width of the vertebra and without creating said undesirable contact. It is therefore not necessary to modify the general structure of the windscreen wiper if the metal of the heating device is changed.

To this end, it proposes a heating device adapted to be mounted on a windscreen wiper articulated on an actuator arm by means of a connection member including a mechanical connector to which the wiper is connected, the wiper lying at least partly in a housing of the mechanical connector, this mechanical connector including an electrical connector connected to the electrical circuit of the vehicle and an electrical connection device connected to the electrical connector, this electrical connection device lying at least partly in said housing of the mechanical connector, the heating device including:
- at least one vertebra adapted to be mounted in at least one housing of the windscreen wiper, a so-called upper face of the vertebra facing the actuator arm in the assembled position of the wiper and the actuator arm and a so-called lower face being opposite the upper face, and
- at least one heating element a first portion of which is on the upper face of the vertebra, characterized in that a second portion of the heating element is on the lower face of the vertebra, the first and second portions of the heating element being in electrical contact with each other.

In this way, the second portion of the heating element on the lower face of the vertebra can have a greater width, this lower portion lying in a relatively uncongested space. Moreover, the electrical contact with the electrical connection device is provided by the first part of the heating element on the upper face of the vertebra, this first portion having a small area enabling it to fit into a restricted space.

The vertebra preferably has substantially the shape of a longitudinal blade of rectangular section that has two opposite longitudinal large faces, namely:

an upper large face facing the actuator arm in the assembled position of the wiper and the actuator arm, and a lower large face facing the wiper blade, the heating element being on the upper large face, at least one of the longitudinal edges of the vertebra and on the lower large face.

The first portion of the heating element is advantageously on the upper face of the vertebra only in the area of contact with the electrical connection device.

In this way, the heating element can easily be installed on the vertebra by placing the second part of the heating element on one of the large faces of the vertebra and then bending the first portion of the heating element over the other large face.

The heating element is preferably a heating film. The heating element may also notably consist of heating wires or a layer of resistive paint.

The heating film is preferably flexible in order to facilitate placing it on the vertebra.

The first portion of the heating element advantageously does not generate heat on the upper face of the vertebra.

The heating film is preferably glued to the vertebra.

The first portion of the heating film on the upper face of the vertebra preferably includes a conductive track at least one end of which is substantially the shape of a contact block with which the electrical connection device is in contact. The conductive track of the heating element is preferably between two sheets of electrically insulative material.

The heating element is advantageously on the upper face of the vertebra, on at least one of the longitudinal edges of the vertebra and on the lower large face of the vertebra.

The section of the heating element on at least one of the longitudinal edges of the vertebra is advantageously different from the section of the heating element on the lower face.

Alternatively, the section of the heating element on the upper face of the vertebra and on at least one of the longitudinal edges of the vertebra is different from the section of the heating element on the lower face.

The specific shape of the end of the conductive track advantageously enables the electrical contact between the electrical connection device and the heating film to be optimized.

In one variant embodiment, the heating device includes two vertebrae and is adapted to be connected to the body of a wiper blade of a windscreen wiper by insertion in two lateral housings of said body. These housings consist of longitudinal axis lateral grooves, each vertebra being adapted to be mounted longitudinally inside a respective groove.

In another variant embodiment of the invention, the heating device is adapted to be mounted on a supporting mount of a windscreen wiper by sliding in a housing of the supporting mount, the vertebra of the heating device being adapted to be mounted longitudinally inside the housing of the supporting mount.

The present invention also consists in a windscreen wiper characterized in that it includes a heating device in accordance with the invention.

The present invention further consists in a wiper device characterized in that it includes a windscreen wiper in accordance with the invention.

The windscreen wiper may advantageously consist of structural elements of the following type:

a longitudinal support including a housing adapted to receive a device in accordance with the invention, a wiper blade fixed to said support, an accessory or "spoiler" that may include at least one washing liquid sprayer manifold, said accessory being assembled to said support.

The windscreen wiper may also consist of structural elements of the following type:

a body including two lateral housings adapted to receive the device in accordance with the invention, a wiper blade.

Other features and advantages of the present invention will become apparent in the light of the following examples and the appended figures, said examples and figures being provided by way of nonlimiting illustration.

FIG. 1, already described, is a representation in cross section in line with the hydraulic connection element of a windscreen wiper with two vertebrae and the hydraulic connection element, highlighting the electrical connection device making the electrical contact with the heating element of the wiper.

FIG. 2, already described, is a representation in cross section offset from the hydraulic connection element of the windscreen wiper represented in FIG. 1.

FIG. 3 is a view of the lower face of the heating device in accordance with the invention highlighting the whole of the heating element.

FIG. 4 is a view of the upper face of the heating device in accordance with the invention.

Figure 5:
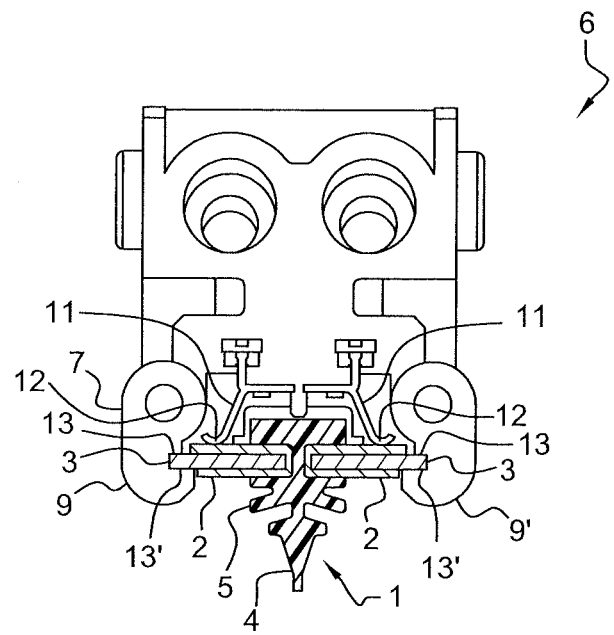
FIG. 5 is a representation in cross section in line with the hydraulic connection element of the windscreen wiper in accordance with the invention and the hydraulic connection element.

To promote a clear understanding, in the remainder of the description elements common to the different figures bear the same references.

As represented in FIGS. 3 and 4, the heating device in accordance with the invention includes a vertebra 3 that is substantially the shape of a longitudinal blade of rectangular section that has two opposite longitudinal large faces, namely an upper large face 13 and a lower large face 13'. In the connected position of the vertebra 3 and the body of the wiper 1, the upper large face 13 is on the convex side of the body 5 of the wiper blade 4, the lower large face 13' being on the concave side of the body 5 of the wiper blade.

The vertebra 3 is made from a relatively rigid material such as steel in order to transfer the pressure of the arm over the whole length of the wiper blade.

A heating element 3 on the lower face 13' and on the upper face 13 of the vertebra 3 makes electrical contact between the first part 14 of the heating element 2 on the upper face 13 and the second part 14' of the heating element 2 on the lower face 13' of the vertebra 3.

This heating element 2 is a heating film that may consist of at least one resistive conductive metal tape or at least one resistive conductive metal track between an upper sheet and a lower sheet of electrically insulative material.

The one-piece heating film 2 includes:
- a second portion 14' having a substantially rectangular shape, intended to be placed on the lower face 13' of the vertebra 3, and
- a first part 14 of smaller size than the second part 14' which has a substantially rectangular shape, intended to be placed on the upper face 13 and on one of the longitudinal edges of the vertebra 3.

In this way, the heating film 2 can be easily installed on the vertebra 3 by first placing the second portion 14' of the heating film 2 on the lower large face 13' of the vertebra 3 and then bending the first portion 14 of the heating film 2 over one longitudinal edge and the upper large face 13 of the vertebra 3.

Figure 6:
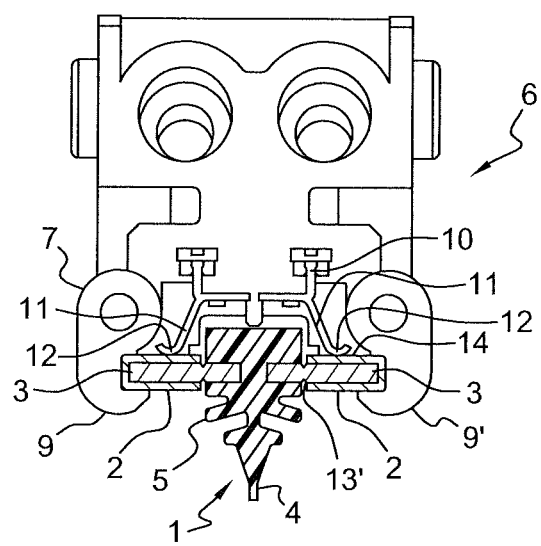
FIG. 6 is a representation in cross section in line with the hydraulic connection element of the windscreen wiper in accordance with the invention and the hydraulic connection element with a specific disposition of the heating element on the vertebra of the heating element.

The heated windscreen wiper 1 represented in FIGS. 5 and 6 includes:
- two vertebrae 3,
- two heating films 2, each heating film 2 being placed on the lower face 13', a longitudinal side and on the upper face 13 of a respective vertebra 3, as described above, and
- a longitudinal axis wiper blade 4 surmounted by a longitudinal axis body 5 that includes connection means of the vertebra 3; these connection means consist of two lateral housings consisting of longitudinal axis grooves conformed so as to allow each vertebra 3 to be mounted longitudinally inside a respective groove, a longitudinal edge of the vertebra to face the longitudinal opening of the groove and a movement in translation directed toward the groove to be imparted to the vertebra 3.

As represented in FIG. 5, in the connected position of the vertebra 3 and the body 5 of the wiper blade 4, the heating film 2 may be in the groove of the body 5 of the wiper 1 on the longitudinal side of the vertebra 3.

As represented in FIG. 6, in the connected position of the vertebra 3 and the body 5 of the wiper 1, the heating film 2 may equally be on the longitudinal side of the vertebra 3 opposite the side that is in the groove of the body 5 of the wiper blade 4. This opposite longitudinal side is the side of the vertebra 3 nested in the groove of the hydraulic connector 7.

The wiper 1 is connected to the windscreen wiper actuator arm by a hydraulic connection element 6 identical to that represented in FIG. 1 and described above.

The hydraulic connector 7 is connected to the heating means 2 by an electrical connection device 10 that includes at least one pair of electrically conductive feet 11 connected to the electrical connector and lying at least partly in said housing of the hydraulic connector 7. Each foot 11 is substantially the shape of a tongue including at its end a shoe 12 in contact with the heating film 2 on the upper face 13 of the vertebra 3.

As can be seen in FIG. 4, the first portion 14 of the heating film 2 on the upper face 13 of the vertebra 3 includes a conductive track the two ends of which are substantially the shape of a contact block 16 with each of which a shoe 12 is in contact. The contact block 16 defines the area of contact with the shoe 12 of the connection device 10. This area of contact is located substantially in the middle of the vertebra, facing the connection device 10 in order to facilitate making the electrical contact.

There is no upper insulative sheet on the contact blocks 16 in order to enable electrical contact to be made between the conductive track and the shoes 12.

In the connected position of the wiper 1 and the hydraulic connector 7 the area of the first portion 14 of the heating film 2 on the upper face 13 of the vertebra 3 substantially corresponds to the substantially facing area of the electrical connection device 10.

In this way, the first portion 14 of the heating film 2 on the upper face 13 of the vertebra 3 has a small area that notably enables this first portion 14 to fit into a restricted space and the vertebra 3 to carry a wider heating film 2.

Figure 7:
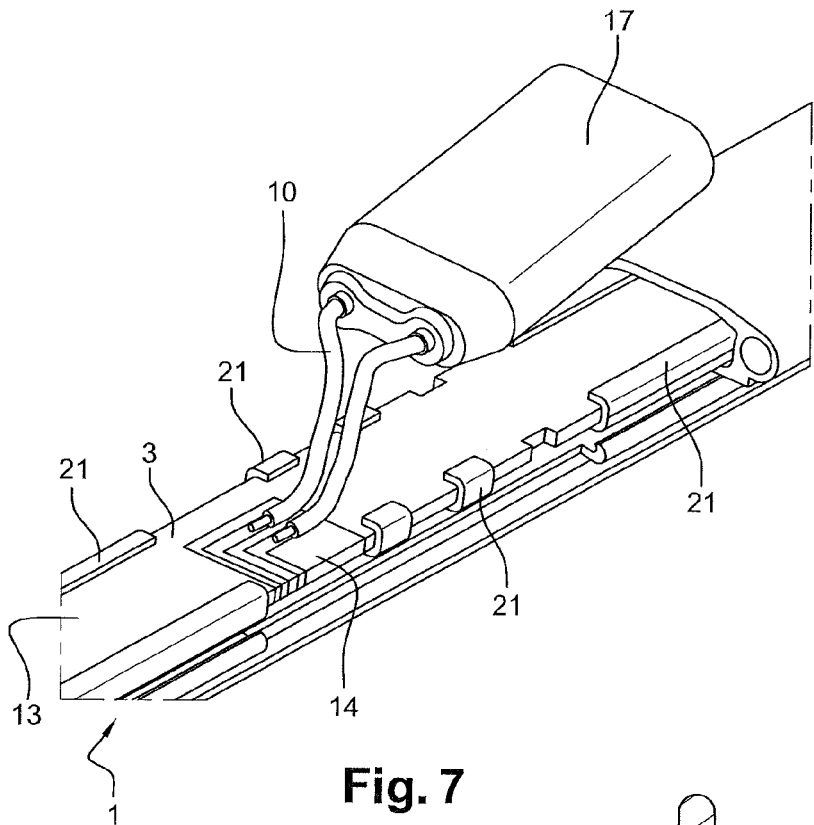
FIG. 7 is a representation of a single-vertebra windscreen wiper in accordance with the invention and an electrical connector.
Figure 8:
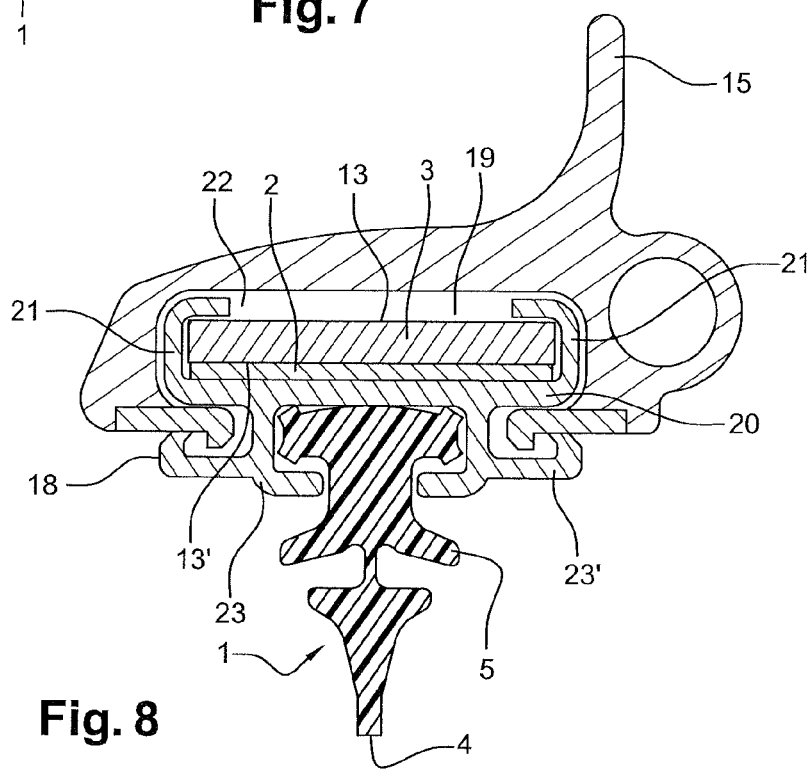
FIG. 8 is a representation in cross section offset from the connection element of a windscreen wiper in accordance with the invention.

As represented in FIGS. 7 and 8, which show another variant, the heating device in accordance with the invention may equally be installed in a single-vertebra "flat-blade" type windscreen wiper 1. A windscreen wiper 1 of this type includes:
- a supporting mount 18 having a longitudinal axis tubular body that includes a longitudinal housing 19 that is open at one of the longitudinal ends at least of the supporting mount 18 and connection means of a wiper blade 4,
- a vertebra 3 inside the tubular body, and
- a one-piece connecting element (not represented) for connecting the wiper 1 to an actuator arm which includes an electrical connector 17 of the above type.

The longitudinal housing 19 is delimited by a longitudinal core 20 and by two walls 21 each extending a longitudinal edge of the core 20, each wall 21 including:
- a first portion extending transversely relative to said core 20, and
- a second portion defining a bend, the two bends of the walls 21 being directed toward each other parallel to said core 20 so as to delimit a longitudinal slot 22,
- the housing 19 being symmetrical with respect to the median transverse axis of said core 20.

In this way, the core 20 and the bends enable locking of the vertebra 3 in the housing 19 in a direction substantially orthogonal to the core 20.

The connection means of the wiper blade consist of two facing longitudinal hooks 23, 23' delimiting a second longitudinal housing the shape of which conforms to the shape of the upper end of the body 5 of the wiper blade 4. In this way, after inserting the upper end of the body 5 of the wiper blade 4 in the second housing, the wiper blade 4 slides longitudinally to its final position.

The heating element 2 on the lower face 13' and on the upper face 13 of the vertebra 3 makes electrical contact between the first portion 14 of the heating element 2 on the upper face 13 and the second portion 14' of the heating element 2 on the lower face 13' of the vertebra 3.

As represented in FIG. 7, the heating element 2 is placed on the upper face 13 so as to allow the ends of the electrical connection device 10 to be connected to the first portion 14 of the heating element 2 on the upper face 13, the electrical connection device 10 consisting here of conductive wires but possibly consisting instead of flexible shoes, for example.

The use of conductive wires 10 advantageously enables positioning of the heating element 2 on the upper face 13 so that it is not necessarily facing the electrical connector 17 in the assembled position of the wiper 1. The heating element 2 on the upper face 13 can therefore be positioned outside the area of connection between the vertebra 3 and the electrical connector 17.

The heating device is assembled to the electrical connector 17 by executing the following steps:

inserting the vertebra 3 into the housing 19 of the supporting mount 18, the vertebra 3 being inserted at one of the longitudinal ends of said supporting mount 18, sliding the vertebra 3 longitudinally to its final position, and making contact between the electrical connection device 10 of the electrical connector 17 and the first portion 14 of the heating element 2 on the upper face 13 of the vertebra 3.

Figure 9:
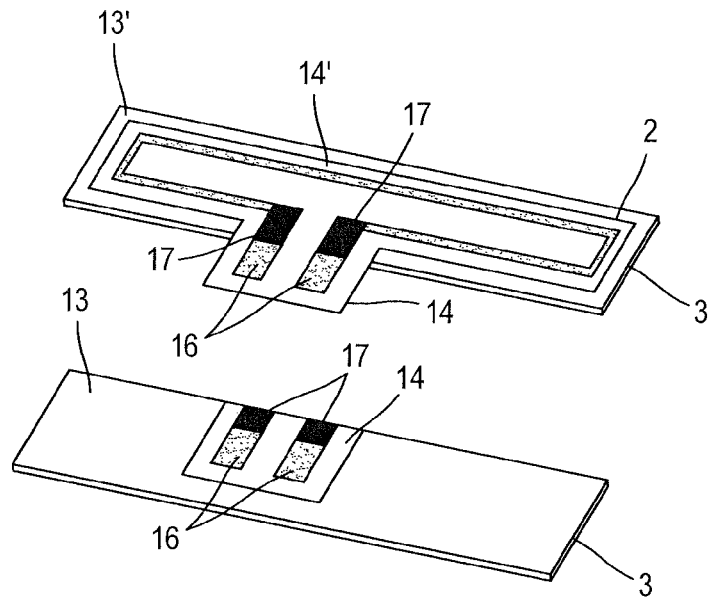
FIG. 9 is an isometric view of the lower and upper faces of the heating device in accordance with a second embodiment of the invention.

FIG. 9 represents an improvement of the invention, notably an enhancement of the heating device from FIG. 3. In fact, the aim is to improve the design of the heating element 2, in particular its resistance to bending and to the risk of localized overheating. Accordingly, the section 17 of the heating element 2 is increased locally, i.e. the section 17 of the heating element 2 is increased only in an area between the contact block 16 on the upper face 13 of the vertebra 3 and the start of the major portion of the heating element 2 on the lower face 13' of the vertebra 3. Thus the section 17 of the heating element 2 is increased locally in the folding or bending area, i.e. in the area in which the heating element 2 is on the longitudinal edge of the vertebra 3.

In this bending area there may be poor adhesion of the heating element 2 to the longitudinal edge of the vertebra 3 and because of this poor transfer of heat to the vertebra 3, so that there is a potential risk of overheating of the heating element 2, which may lead to it being damaged, and lead to loss of the heating function. In fact, thanks to the larger section 17, the heating element 2 is firstly mechanically stronger in the event of bending or folding. Moreover, by locally increasing the section 17 of the heating elements 2, this leads to a reduction in resistance and therefore to a reduction in the energy dissipated by the Joule effect and therefore in local heating.

Alternatively, it may be possible to have the material of the heating element on the upper face of the vertebra or the material of the heating element on the upper face of the vertebra and on the longitudinal edges of the vertebra which is different from the material of the heating element on the lower face. For example, the material on the upper face of the vertebra or the material of the heating element on the upper face of the vertebra and on the longitudinal edges of the vertebra can be a conductive material and the material on the lower face of the vertebra can be a resistive material.

Figure 10:
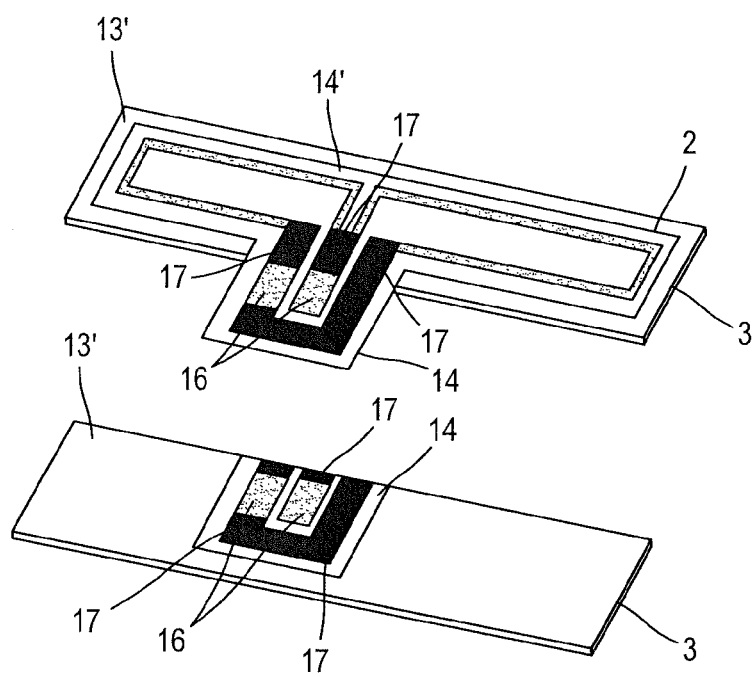
FIG. 10 is an isometric view of the lower and upper faces of the heating device in accordance with a third embodiment of the invention.

This solution is applicable to the heating element 2 with a conductive track in a "series" structure, as represented in FIG. 9, or a "parallel" structure, as can be seen in FIG. 10.

The invention claimed is:

1. A heating device adapted to be mounted on a windscreen wiper articulated to an actuator arm, the heating device comprising:
   at least one heating element, the heating element comprising:
      a U-shaped cross section with a first portion of the heating element comprising a contact block configured to electrically power the heating element,
         wherein the first portion is located on at least a portion of an upper face of a first vertebra of the windshield wiper, the first vertebra being mounted in a housing of the windscreen wiper, with the upper face of the first vertebra facing the actuator arm in the assembled position of the windscreen wiper and the actuator arm, and
         wherein in a longitudinal direction, parallel to the greatest dimension of the first vertebra, the contact block is located substantially equidistant between longitudinal ends of the first vertebra; and
      a second portion of the heating element located on at least a portion of a lower face of the first vertebra, the lower face being opposite to the upper face,
         wherein the first and second portions of the heating element are in electrical contact with each other.

2. The heating device according to claim 1, wherein the first vertebra has the shape of a substantially longitudinal blade of rectangular section.

3. The heating device according to claim 1, wherein the contact block is in contact with an electrical connection device.

4. The heating device according to claim 3, wherein boundaries of an area of contact between the contact block and the electrical connection device substantially delimit the first portion of the heating element on the upper face of the first vertebra.

5. The heating device according to claim 1, wherein the heating element is on the upper face of the first vertebra, on at least one of the longitudinal edges of the first vertebra and on the lower face of the first vertebra.

6. The heating device according to claim 1, wherein a section of the heating element on at least one of the longitudinal edges of the vertebra is different from a section of the heating element on the lower face.

7. The heating device according to claim 1, wherein the heating element is a heating film consisting of at least one conductive track between two sheets of electrically insulative material.

8. The heating device according to claim 1, wherein the heating element is a heating wire.

9. The heating device according to claim 1,
   wherein the windshield wiper further comprises a second vertebra, wherein the heating device is adapted to be connected to a body of a wiper blade of the windscreen wiper by insertion in two lateral housings of said body having longitudinal axis lateral grooves, each vertebra mounted longitudinally inside a respective groove.

10. The heating device according to claim 1, wherein the heating device is mounted on a supporting mount of a windscreen wiper by sliding in a housing of the supporting mount, the vertebra of the heating device being adapted to be mounted longitudinally inside the housing of the supporting mount.

11. A windscreen wiper comprising the heating device according to claim 1.

12. A windscreen wiper including structural elements consisting at least of:
   a longitudinal support;
   a wiper blade fixed to said support; and
   an accessory including at least one washing liquid sprayer manifold, said accessory being assembled to said support,
   wherein the windscreen wiper comprises the heating device according to claim 1 in a housing of said support.

13. A windscreen wiper including structural elements consisting at least of:
   a longitudinal support;
   a wiper blade fixed to said support; and
   an accessory assembled to said support,
   wherein the windscreen wiper includes the heating device according to claim 1 in a housing of said support.

14. A windscreen wiper including structural elements consisting at least of:
   a body including two lateral housings; and a wiper blade, wherein the windscreen wiper includes two heating devices according to claim 1 in each lateral housing of said body.

15. A vehicle wiper device, comprising:

at least one windscreen wiper comprising a heating device according to claim 1, wherein the heating device is mounted on a supporting mount of a windscreen wiper by sliding in a housing of the supporting mount, the vertebra of the heating device being adapted to be mounted longitudinally inside the housing of the supporting mount.

\* \* \* \* \*